Aug. 5, 1952     L. L. CAMPBELL     2,605,695
WEIGHING APPARATUS
Filed March 27, 1948     4 Sheets-Sheet 1
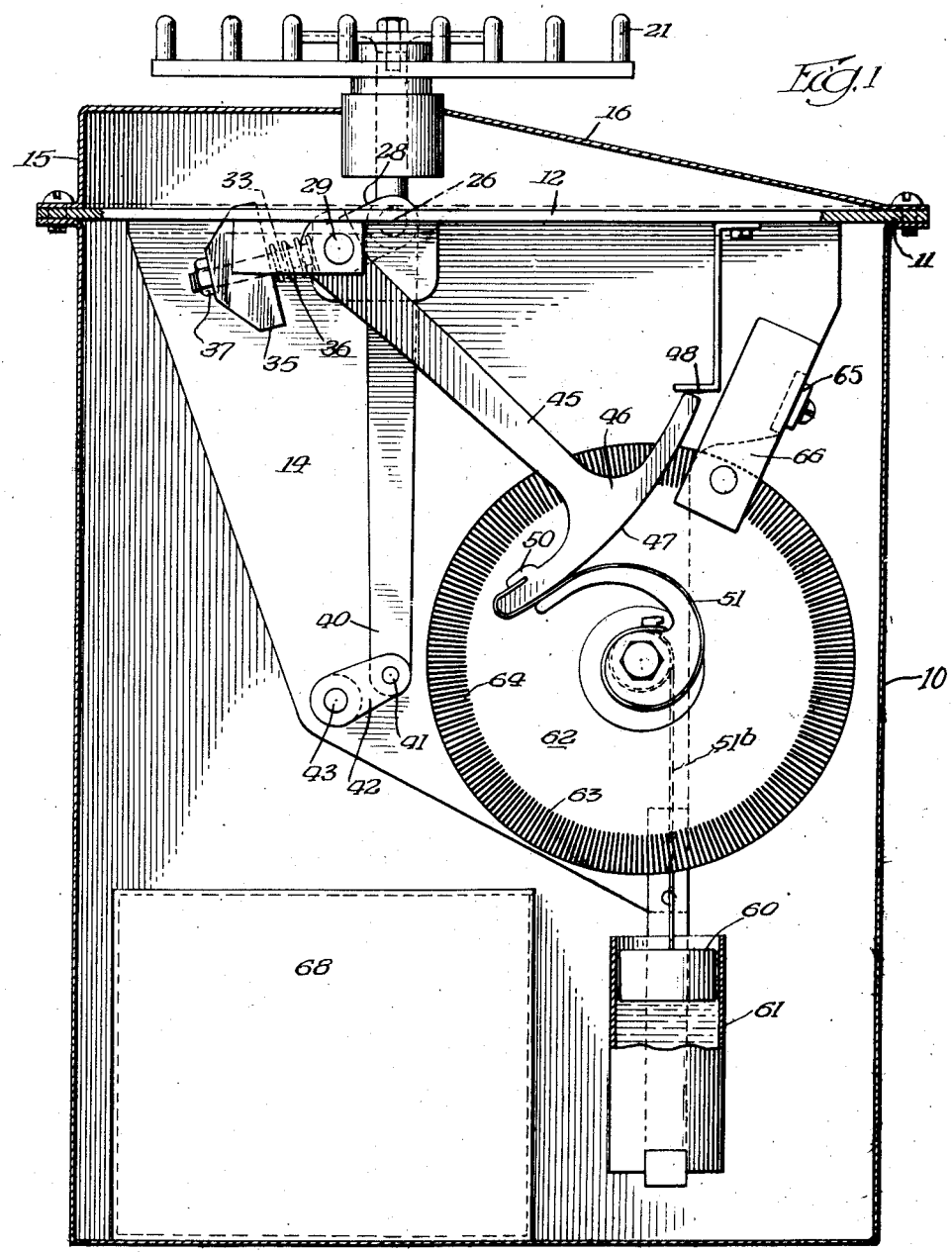
Inventor
Lyman L. Campbell
By Schneider & Dressler
Attys Aug. 5, 1952  L. L. CAMPBELL  2,605,695
WEIGHING APPARATUS
Filed March 27, 1948  4 Sheets—Sheet 2
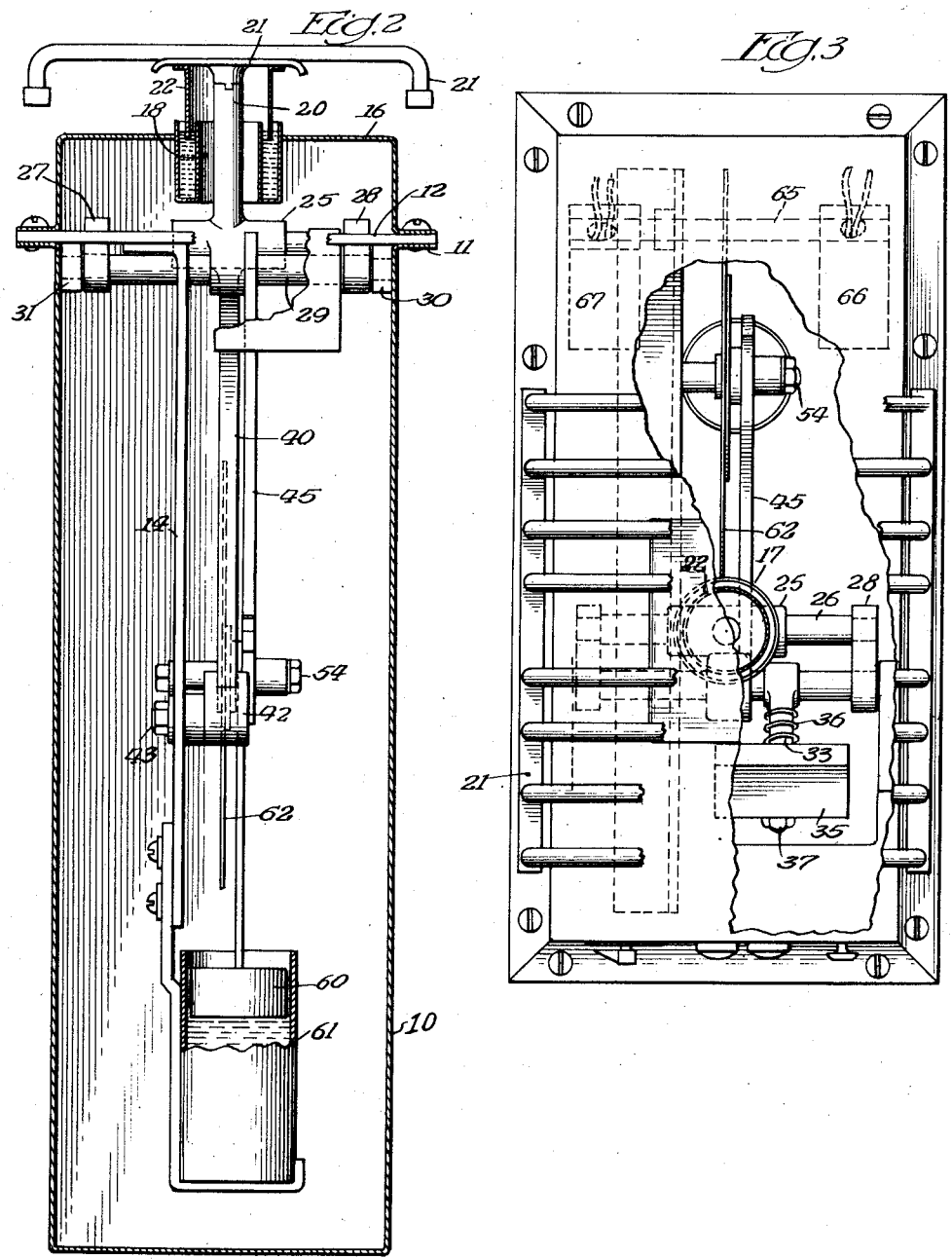
Inventor
Lyman L. Campbell
By: Schneider & Dressler
Attys Aug. 5, 1952  L. L. CAMPBELL  2,605,695
WEIGHING APPARATUS
Filed March 27, 1948  4 Sheets-Sheet 3
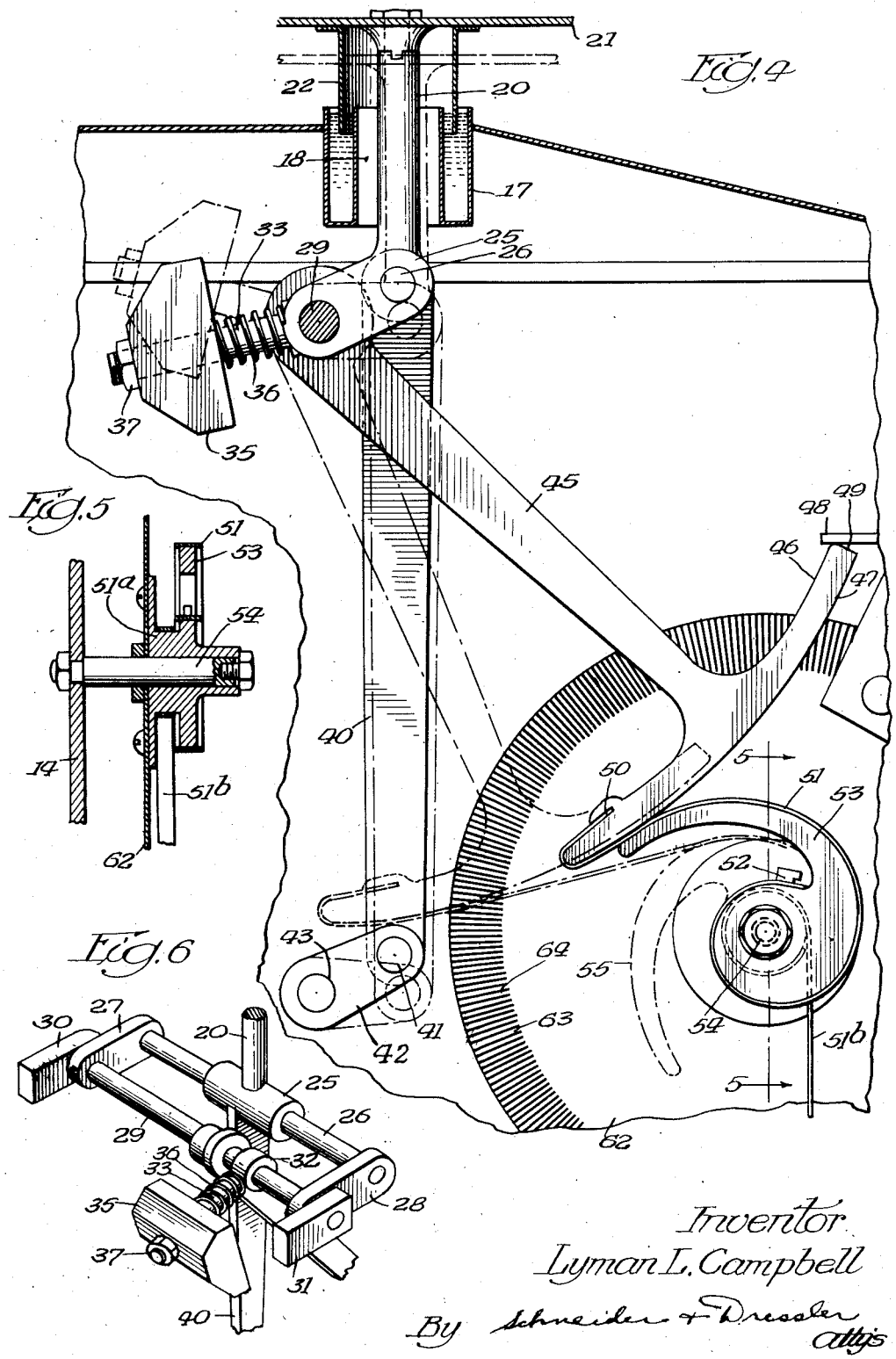
Inventor
Lyman L. Campbell
By Schneider & Dressler
attys

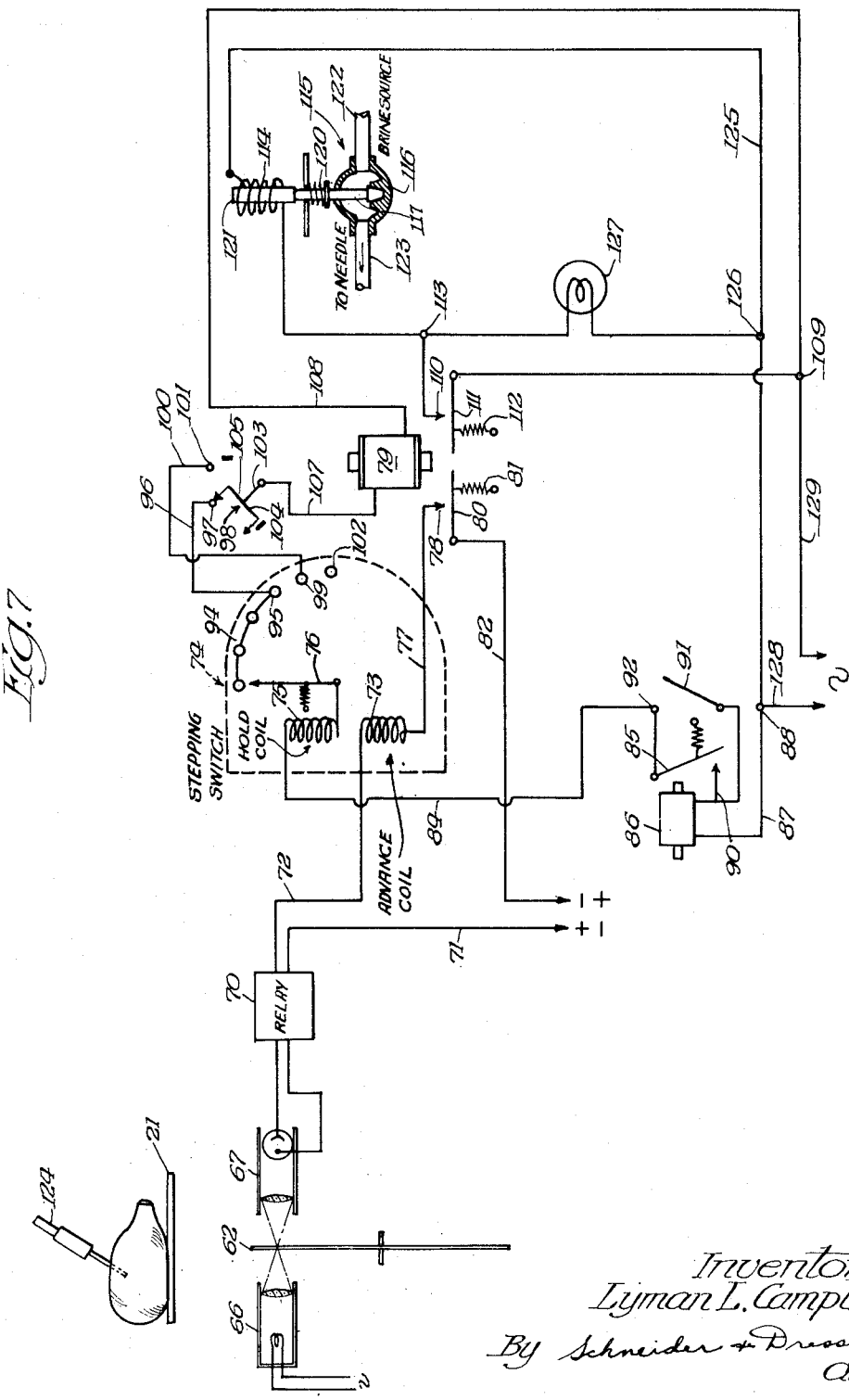

UNITED STATES PATENT OFFICE 2,605,695

WEIGHING APPARATUS

Lyman L. Campbell, Chicago, Ill., assignor to Wilson & Co., Inc., a corporation of Delaware Application March 27, 1948, Serial No. 17,520

11 Claims. (Cl. 99—256)

This invention relates to a weighing system and particularly to a system for adding or subtracting a predetermined proportion of any base weight falling within the operating range of the system.

In many industrial operations, it is important that material first be weighed to determine what may be considered as its base weight, then processed to a point where its base weight is increased or decreased, as the case may be, by a fixed percentage of the base weight. Thus in many chemical fields, a batch of liquid or other material may require addition of other materials in proper proportion. It is frequently desirable to increase the concentration of a quantity of liquid by driving off a fixed percentage of the liquid. This is also true with solids and suspensions.

A particular field of application of the present invention is food processing. Thus as an example, certain meat products as hams, corned beef, smoked beef and butts customarily require the addition of a curing liquid during processing. The addition of such liquids is done on an accurate proportional basis, with the added liquid bearing a fixed predetermined ratio to the mass of the body to which it is added. Thus in hams, it is customary to inject or "pump" brine into the ham, the brine quantity bearing an accurate and fixed ratio to the mass of the ham.

In the food processing field, delicacy of flavor as well as the large scale of operations require that accuracy and economy be paramount in the application of the invention. In addition, it is essential that the invention be susceptible to current processing steps with a minimum of change and expense. At present, processing involving a proportional change of some base weight is carried on in a rather primitive fashion. Thus with ham processing, the base weight of the ham is first determined. Then the operator either calculates the additional weight or refers to charts or tables for such additional weight. In some instances, a weighing pointer is used with several scales, one showing the base weight and the other showing the differential weight to be added by "pumping" with brine.

It should be borne in mind that uniformity of mass in such products as hams, butts, etc. is a practical impossibility. At best, a range of what might be termed standard or normal weights is possible. In the case of hams, for example, such range is generally between about 8 pounds and 26 pounds. The relatively few hams falling outside of this weight range are treated individually. In the case of the hams weighing from about 8 to 26 pounds, each ham usually has its weight increased with curing liquid by a constant weight, say 8%, which must be accurate within fairly narrow limits.

It is of course within the purview of this invention to provide apparatus which will handle a batch of any material, irrespective of its base weight, and will subtract or add, as desired, any fixed proportion of differential weight. However, for simplicity, the invention will be described in connection with ham processing where a predetermined percentage of base weight is to be added.

In accordance with the invention there is provided a first member which is adapted to rotate through an angle directly proportional to the base weight of the batch material to be processed, ham in this instance. This member is coupled to a second member in such a manner that increments of movement of the second member are logarithmetically related to corresponding increments of movement of the first member. In other words, the derivative of second member movement with respect to first member movement is a logarithmic function.

As a result of this relationship between the movements of the two members, a constant linear or angular unit of travel of the second member is translated to the first member into an angle which is proportional to the size of the angle from which the reference is made. Thus the second member may be endowed with simple means to indicate or control a weight variation (either positive or negative) bearing a fixed predetermined ratio to any base weight lying within the operating range of the system. Such control means may be functionally related to a means for causing the base weight to be varied by the desired proportion.

In this particular instance, the second member is provided with spaced light transmitting portions. The portions are spaced uniformly with reference to linear or angular measurement. Photoelectric means are provided for cooperation with said second member. A stepping switch system having a predetermined number of steps for a travel range is provided for control by said photo-cell system. Thus in effect, the second member may be considered as effectively geared to a device (stepping switch) having a predetermined travel range with respect to a starting position.

The entire weighing process is carried out in two steps. The first step involves the determination of base weight of the material being handled. In this step, the first and second members assume positions corresponding to the base weight. After equilibrium conditions obtain, processing of the material may be initiated. Simultaneously, the proportional weight control may be put into operative condition. Thus as the material being processed undergoes a change in weight, the first and second members move correspondingly. The movement of the second member during processing is now geared or related to some other means as the stepping switch, to provide a predetermined range. The processing should be controlled as to maintain the weight variation within this predetermined range and the processing terminated when the limit of such range has been reached.

An exemplary embodiment of the invention will now be described in connection with the drawings wherein:

Figure 1 is an end elevation with certain parts broken away, of an apparatus embodying the invention;

Fig. 2 is a front elevation of the apparatus shown in Fig. 1, but with one wall of the casing broken away to show the mechanism;

Fig. 3 is a top plan view with certain parts broken away, of the apparatus shown in Fig. 1;

Fig. 4 is an enlarged detail of certain parts of the mechanism;

Fig. 5 is a sectional detail on line 5—5 of Fig. 4;

Fig. 6 is a perspective detail of the pendulum mounting; and

Fig. 7 is a circuit diagram showing the electrical connections for the entire weighing system.

While the weighing apparatus may be of any type and may be mounted in any desired fashion, the invention utilizes the well known counterbalance type of scale disposed in case 10 of sheet steel or the like. Case 10 has mounting flange 11 upon which is bolted base plate 12 from which depends mounting plate 14. Bolted to mounting flange 11 and extending above the same is auxiliary casing 15 provided with top wall 16. The entire casing structure preferably is hermetically sealed.

Top wall 16 has annular well 17 containing liquid, such as mineral oil for example, forming part of a liquid seal structure. Well 17 encloses clearance opening 18 within which rod 20 operates. Rod 20 carries at its upper end scale platform 21 of any suitable construction. As shown, this platform has a skeleton construction for supporting solid material, as a ham, and permitting liquid or small particles to fall away. Skirt 22 carried by the solid central portion of the platform extends into well 17 and is adapted to dip into the well liquid at all times. It is understood that the space around rod 20 and within skirt 22 is thus hermetically sealed in all positions of the scale platform.

In the normal operating position of the apparatus, rod 20 will float vertically and be movable downwardly in response to weight upon the scale platform. Thus rod 20 terminates in boss 25 (Fig. 6) whose axis is horizontal and through which passes floating pivot pin 26. Pin 26 has its ends carried by spaced parallel links 27 and 28. Links 27 and 28 are carried by pendulum pivot pin 29, this pin being parallel to pin 26. Pin 29 and floating links 27 and 28 are journalled in bearing blocks 30 and 31 rigidly supported from base plate 12. Pin 29 has rigidly attached thereto ring 32 from which extends transversely thereto arm 33 having its free end threaded. Carried by this arm is counterbalance weight 35 maintained in position by coil spring 36 and nut 37 disposed as shown.

Boss 25 is at the upper free end of rod 40 which may be considered for all practical purposes as an extension of rod 20. The bottom end of rod 40 is pivotally joined at 41 to link 42 supported on pivot bolt 43 carried by vertical plate 14. As is well understood in this art, pins 29 and 43 are parallel and in the normal position of the apparatus should be vertically aligned. Link 42 is equal in length to links 27 and 28. Hence rods 20 and 40 will always retain their vertical position. In use, some lateral displacement of these rods occurs and to this end sufficient clearance in well 17 for lateral movement of skirt 22 should be provided.

Rigidly supported on pivot pin 29 is arm 45 carrying segment 46 at its free end. Segment 46 has arcuate surface 47 concentric with the axis of pin 29. Base plate 12 carries stop 48 adapted to cooperate with end 49 of the segment arm to determine a minimum or zero setting for the weighing apparatus. Segment 46 has attached thereto, as at 50, flexible strap or ribbon 51 of spring steel, phosphor bronze or the like. Ribbon 51 has its other end attached at 52 to cam 53 mounted on pin 54. Cam 53 is movable about the axis of pin 54, which is spaced from but parallel to the axis of pin 29.

Cam 53 has cam surface 55 having the general shape of a logarithmic spiral with reference to the cam axis. The maximum and minimum radii of the spiral will depend upon the range of weights to be handled, the engineering details of the apparatus and other factors which will be evident to one skilled in this art. The actual contour of the cam surface may depart from a true logarithmic spiral because of various mechanical departures from mathematical accuracy throughout the mechanism.

The mechanism from the scale platform up to and including segment 46 may be conventional. The movement of segment 46 should be directly proportional to the weight upon the scale platform and in this particular instance may be obtained by the off-set linkage system. It will be apparent that the segment arm will be moved clockwise, as seen in Figures 3 and 4, upon the application of weight to the platform. Assuming that ribbon 51 will be maintained taut by means to be described later, it will follow that the cam will be rotated upon movement of segment 46. A length of arc along the cam should be proportional to the weight upon the platform since the movement of segment 46 is thus related to the weight.

It is desired to have some constant angle of cam rotation at any spot on the cam directly proportional to the total amount of weight upon the platform. Thus, as an example, segment 46 will move through equal angles for a change of one pound upon the scale platform irrespective of whether the change is from 8 to 9 or 15 to 16 or any other part of the range. However it is desired to have the cam rotate through the same angle, say 1 degree, for a constant proportion of the weight from which the angle is measured. As an example, it is desired to have the cam rotate through the same angle when the weight changes from 8 pounds by 10% as when the weight changes from 15 pounds by 10%. Thus the cam angle must be constant even though the actual arithmetical change in weight will differ, depending upon the portion of the range being used. Thus at 8 pounds, 10% is 0.8 pound while at 15 pounds, the same percentage is 1.5 pounds.

Expressed mathematically, $ds/s$ equals $kd\theta$ where $s$ is the integral of differential element $ds$ of arc along the cam and $\theta$ is the angle of cam travel. Letter $k$ is a constant. The solution to this equation is the familiar logarithmic spiral, whose general equation is $k\theta$ equals log $er$, where $e$ is the Napierian base and $r$ is the radius vector. It is desirable to have the arc on segment 46 and the length of the cam surface somewhat longer than required by the range of weights handled in order that inaccuracies due to mechanical considerations be avoided.

Ribbon 51 is anchored to inner end 52 of the cam as noted above. The cam has drum portion 51a around which is wound strap 51b whose free end carries weight 60. Weight 60 operates in cylinder 61 to provide a dashpot which is suitably supported by a bracket from mounting plate 14.

Cam pivot pin 54 is suitably carried by mounting plate 14 for rotation and the pin carries control disk 62 to rotate with cam 53. Disk 62 may be of any material either transparent or opaque to light. Peripheral portion 63 of the disk is designed to provide alternate light transparent and opaque radial slots. Thus disk 62 may be of transparent plastic and have darkened radial lines 64 uniformly disposed along the peripheral portion. Preferably the space between adjacent lines is somewhat greater in angular extent than that of each line so that a dark portion is angularly smaller than a light portion. This relationship may be reversed. In any event it is desirable that alternate light and dark radial regions be unequal in angular extent in order to improve the stability of operation, as will be apparent later. All light transparent portions will be equal. Similarly light opaque elements will be equal. The accuracy of the system in general will be a function of the angular extent of a light or dark portion, whichever is greater. It will be evident that finely divided light and opaque portions are desirable. The length of the portions along the disk radius is unimportant within substantial limits.

Carried by bracket 65 are light source 66 and photoelectric cell 67 on opposite sides of disk 62 to cooperate with peripheral portions 63. Light source 66 may consist of an electric light and lens system designed to focus a sharp line of light radially of the disk at the peripheral portion. It is important that the focus be sharp so that the line of light is in line with the radial elements of the disk and is sharp enough so that it is at least as narrow as a light transparent or opaque element in the disk, whichever is smaller. It is clear that any rotary movement of the disk which does not either cut in or cut out the light beam to the cell will represent lost motion and will determine the sensitivity of the system as a whole, as will be apparent later in connection with a description of the electrical portion of the system.

From the property of a logarithmic spiral, it will be evident that a certain number of dark elements, say five, subtending a certain angle, say 10 degrees, will represent a constant proportion of the weight corresponding to the position of that particular group of five along the peripheral portion of the disk. Thus the apparatus may be designed so that disk 62 has a rotational range of 360 degrees for the entire range of weights to be handled. In the example previously discussed, the disk will rotate 360 degrees between weights of 8 and 26 pounds, respectively. It is apparent that the actual rotational range of disk 62 is of no consequence in itself. What is important is that increments of length along the disk control portion have the relationship set forth.

Referring now to Fig. 7, the remaining portion of the complete system is shown in diagrammatic form. Such portions of the system may be disposed in any desired manner and in general the electrical part of the system may be conveniently housed in cabinet 68. The output of photoelectric cell 67 is fed to relay 70. Relay 70 may be any one of a number of well known devices available on the market for operating with the output of a photoelectric cell. Thus relay 70 may consist simply of a grid-controlled gas tube. Examples of detailed photoelectric relay circuits are disclosed in "Industrial Electronic Control" by Cockrell, 1944 edition, pages 160, 178 and 186.

Relay 70 has power output circuit connected to lead 71 on the one hand going to some source of power, either D. C. or A. C. The other relay lead 72 goes to advancing coil 73 of stepping switch 74. Switch 74 is of the type having holding coil 75 and advancing coil 73 with movable wiper 76 traveling over a bank of contacts. This type of switch is provided with ratchet and holding means and is adapted to have the wiper advance one contact for each energization of the advancing coil, providing the holding coil is energized. Wiper 76 is spring biased to a normal zero position to which the wiper will return when the holding coil is de-energized.

Such switches are well known in various switching applications, such as in automatic telephone exchanges and various counters. An example of this general type of switch is disclosed in Patent 2,281,262 issued April 28, 1942.

The circuit from lead 72 through advancing coil 73 continues to lead 77 and fixed contact 78 of relay 79. Fixed contact 78 is adapted to cooperate with movable contact 80 of the relay. Movable contact 80 is normally biased to an open position by spring 81 and is connected by lead 82 to the other terminal of the A. C. or D. C. power source.

Holding coil 75 of stepping switch 74 is connected by wire 84 to movable contact 85 of self-locking relay 86. The winding of self-locking relay 86 is connected on the one hand by lead 87 to junction 88. The other terminal of the self-locking relay winding is connected to fixed contact 90 of the relay and is also connected to movable contact 91 of a manual switch having fixed contact 92 connected to line 84. As is clearly evident, movable contact 85 of the self-locking relay is normally biased to an open position.

Referring to stepping switch holding coil 75, the lower terminal thereof is connected to wiper 76. Wiper 76 plays over a bank of contacts generally indicated by numeral 94. Thus the bank may have so many individual contacts as are deemed to be necessary, it being understood that the ratchet mechanism of the stepping switch advances the wiper from one contact to the next.

Merely by way of example the bank is shown as having six contacts. A number of contacts in the bank, starting from the normal zero wiper position, are connected together. Thus as shown, the first four bank contacts are connected together by wires to form a unit. End contact 95 of this unit here is connected by wire 96 to contact 97 of manual selector switch 98. Bank contact 99, adjacent contact 95, is connected by wire 100 to contact 101 of switch 98. Bank contact 102 adjacent contact 99 is dead.

Switch 98 has movable contact arm 103 containing contacts 104 and 105 coupled together to function as a unit. These movable contacts are adapted to accupy either the position shown where contact 105 touches contact 97, or a position where contacts 97 and 101 are connected to contacts 104 and 105.

Movable contact arm 103 is connected by lead 107 to one terminal of the winding of relay 79. The other terminal of this relay winding is connected to wire 108 going to junction 109.

Relay 79 has fixed contact 110 adapted to cooperate with movable contact 111, the latter normally being biased to an open position by spring 112. Relay contact 110 is connected to junction 113. Junction 113 is connected to winding 114 of an electrically operated valve 115 having valve body 116 and valve element 117 normally biased to a valve closing position by spring 120. Winding 114 cooperates with armature 121 attached to the valve element and adapted to open the valve upon energization of the winding. Inasmuch as electromagnetic valves for the control of liquids are well known, a more detailed description thereof is deemed to be unnecessary. The valve itself has inlet 122 for connection to a source of brine under suitable pressure. Valve 115 has outlet 123 for connection to needle 124 to be used in "pumping" brine into a ham, for example.

Referring to valve winding 114, the circuit continues to wire 125 through junction 126 and to junction 88. Across junctions 113 and 126 is lamp 127 for indicating when the valve is open or closed. Junctions 88 and 109 are connected by leads 128 and 129 to any suitable source of power such as a 60 cycle line.

The operation of the entire system is as follows: Normally switch 91 is open and the entire electrical system is quiescent. It is understood, of course, that light source 66 is maintained at brilliance at all times. Assuming that the weighing apparatus has been suitably calibrated, segment arm 46 will be in a rest position bearing against stop 48.

Cam 53 and light controlling disk 62 will both be in what may be termed a zero position. Now assume that a ham or other product to be handled, is placed upon scale platform 21. The platform will drop to some dotted line position (Fig. 4). Weight 35 will be raised through the linkage system and at the same time arm 45 will be turned clock-wise to the dotted line position. Flexible strap 51 will be moved to raise weight 60 in dashpot 61 and at the same time will turn cam 53 counter-clock-wise. By having arm 45 long in comparison to the length of surface 47 of the segment arm, it will be apparent that the difference in length between the straight portion of ribbon 51 and that portion of surface 47 of equal angular extent will be small. This difference merely represents the departure of the cam surface 55 from a true logarithmic spiral. In practice, cam surface 55 will have to be altered from a real spiral by simple cut and try methods usual in making cam surfaces. By virtue of the dashpot arrangement, the weighing apparatus will quickly come to equilibrium. Thus disk 62 will be moved through a certain angle and assume a new position corresponding to the base weight of the ham. It will be evident that segment 46 will have moved through an angle whose magnitude is directly proportional to the base weight of the ham. Similarly disk 62 will move through a different angle whose magnitude is a logarithmic function of the base weight.

When the apparatus has been stabilized at the base weight of the ham and the needle applied to the ham (it is understood that suitable compensation in the weighing must be made for the needle which may be considered as a constant), switch 91 will be closed by an operator. This will establish a circuit from junction 88 through wire 87, through the winding of relay 86 to switch contacts 91 and 92, then along wire 84, through holding coil 75 to wiper 76, then to the zero contect of bank 94, then to contact 95, along wire 96 to contact 97, then switch arm 103, wire 107, the winding of relay 79, wire 108 to junction 109. The flow of current will cause self-locking relay 86 to close so that the circuit is now independent of the position of switch 91.

At the same time, relay 79 will pull its two movable contacts into closed position. Movable contact 111 will complete a circuit from junction 109 to junction 113 thence through valve winding 114 to junction 126 and thence to junction 88. The lamp circuit will be completed between junctions 113 and 126. It is thus clear that the valve will be opened and the lamp lit, thus indicating that brine is flowing to the needle and into the ham. Thus a ham processing cycle will be initiated.

As the weight of the ham increases, due to flow of brine, disk 62 is turned from its base weight position. The movement of disk 62 interrupts the light and alternately causes relay 70 to open and close the relay circuit. This relay circuit extends from wire 71, through relay 70 and wire 72, advancing coil 73, wire 77, contact 78 to movable contact 80, along wire 82 and back to the power source. Each time that a transparent and opaque element on the disk passes the light source, the cell goes through an operating cycle and causes the relay to go through an operating cycle. A complete operating cycle for the relay may consist of either starting with a normal open relay circuit and then closing the same and finally opening, or it may consist of a normal closed relay with an opening of the relay and then back to a closed position. In any event, one operating cycle will result in coil 73 advancing wiper 76 one switch contact along the bank.

It is clear that the continuity of the circuit including holding coil 75 in the stepping switch depends upon wiper 76 bearing against a live contact in the contact bank. It is understood, that any slight opening of the stepping switch circuit due to wiper 76 moving from one live contact to the next live contact, will not disable the system. This is taken care of by having the other relays in the circuit slow acting or by using bridging wipers.

It is evident that as disk 62 moves in accordance with the weight increase due to processing, that wiper 76 will correspondingly move along the switch bank. When the weight increase has reached a predetermined proportion determined by the number of live contacts cooperating with wiper 76, the additional advance of wiper 76 to a dead contact will disable the system by opening the main relay circuit. In practice, the first dead contact should represent the end of the range of the weight increase desired. The rate of weight increase should be slow enough to permit the system to cut the brine off promptly.

It is evident that by subdividing the light transmitting and light opaque portions of disk 62 into small portions as far as angle is concerned, that substantial accuracy as regards weight may be obtained. For each separate light or dark spot, as the case may be, in the number necessary to accommodate the desired change of weight, there will have to be provided a contact in switch bank 94. Thus as an example, one inch along portion 63 of disk 62 may represent 5% variation of weight and may have 25 separate light transmitting portions. If 5% variation in weight is desired, then bank 94 will require 25 contacts, the 25th contact being dead. It is clear, that selector switch 98 may be used to vary the desired percentage of weight increase.

The same system may be used for predetermining a weight decrease instead of a weight increase.

In order to prevent false operation, manual switch 91 may be provided with a dashpot or other means to delay the closing. This delay should be long enough to permit the weighing mechanism to come to equilibrium for establishing a base weight. Thus if an operator operates switch 91 prematurely, the switch will not close until after the system is ready.

While a counterbalance type of scale has been disclosed, it is evident that spring scales or beam scales may be used. In any event, arm 45 should be one member movable through an angle whose magnitude is proportional to the weight upon the platform. Cam 53 may be a second member coupled to arm 45 in such manner that the cam rotation is a logarithmic function of the weight.

It is understood that the means for maintaining the flexible strap taut will tend to aid in restoring the scale mechanism to zero as well as furnishing part of the load against which the mass of the article being weighed is measured. Thus, if a spring scale is substituted for the weight disclosed then the force necessary to maintain the ribbon taut will form part of scale load.

Casing 10 may contain suitable moisture absorbing material such as silica gel, quicklime or the like, for preventing rusting of the mechanism.

What is claimed is:

1. A system for controlling the weight variation of an article during processing, said system comprising a scale for weighing said article and including a first member movable in linear relation to the weight of said article, a second member movable around an axis, means for coupling said two members together, said coupling means including means for transforming the movement of said second member so that it is logarithmically related to the movement of said first member, means for initiating processing of said article after said scale has reached equilibrium in weighing said article, and process control means responsive to a predetermined angular movement of said second member for terminating processing of said article whereby the base weight of said article may be varied by a predetermined ratio during a processing cycle.

2. A system for controlling the weight variation of an article during processing, said system comprising a scale for weighing said article and including a first member movable in linear relation to the weight of said article, a second member movable around an axis, means for coupling said two members together, said coupling means including means for transforming the movement of said second member so that it is logarithmically related to the movement of said first member, means for initiating a processing cycle for said article after said scale has reached equilibrium in weighing said article, and means including photoelectric means responsive to a predetermined movement of said second member for terminating said processing cycle whereby said article may have its base weight changed by a predetermined percentage.

3. A system for controlling the weight variation of an article during processing, said system comprising a scale for weighing said article and including a first member movable in linear relation to the weight of said article, a second member movable around an axis, means including a cam having the general shape of a logarithmic spiral for coupling said two members together, said second member movement being proportional generally to the logarithm of said article weight, means for initiating a processing cycle upon said article after said scale has reached equilibrium in response to the base weight of said article prior to processing, and means responsive to a predetermined angular movement of said second member during the processing cycle for terminating said cycle.

4. The system according to claim 3 wherein said second member includes a disk having an annular light control portion, and wherein said means responsive to second member movement includes a light source and a photoelectric system, said control portion being adapted to alternately interrupt and transmit light to said cell with disk movement, and a counter for counting the light interruptions resulting from disk movement.

5. A system for controlling the weight variation of an article during processing, said system comprising a scale for weighing said article and including a first member movable around an axis in generally linear relation to said article weight, a second member movable around an axis, means including a cam having the general shape of a logarithmic spiral for coupling said two members together whereby the cam movement is generally proportional to the logarithm of said article weight, means for initiating a processing cycle upon said article after said scale has reached equilibrium in response to the base weight of said article prior to processing, means for alternately opening and closing a circuit in response to a predetermined angular movement of said second member and means responsive to a predetermined number of circuit interruptions for terminating said process.

6. A system according to claim 5 wherein said circuit interrupting means includes a disk movable with said second member and having a light control portion, a source of light and a photoelectric cell cooperating with said light control portion.

7. A system for controlling a weight variation during processing, said system comprising a scale for weighing said article and including a first member movable in linear relation to the weight of said article, a cam mounted for movement around an axis and having a cam surface of the general shape of a logarithmic spiral, flexible means extending between said first member and said cam and cooperating with said cam surface for imparting movement to said cam, the ratio of movement of said cam to said first member being generally a logarithmic function, a disk movable with said cam, said disk having an annular control portion comprising alternate transparent and opaque regions, a photo-electric system controlled by the annular disk portion for generating electrical pulses with movement of said disk, means operated by the output of said photo-electric system for counting a predetermined number of electrical pulses from said photo-electric system corresponding to a predetermined disk movement, means for controlling said counting means to render the same inoperative or operative, as desired, means for initiating processing simultaneously with the operation of said counting means, and means responsive to a predetermined count corresponding to a predetermined movement of said disk for indicating the end of a process cycle.

8. A system for controlling the weight variation of an article during processing, said system comprising a scale for weighing said article and including a member movable about an axis in linear relation to said article weight, a cam movable about an axis and having a cam surface of the general shape of a logarithmic spiral, means for coupling said first member to said cam surface for imparting movement to said cam in logarithmatic relation to said first member movement, a disk movable with said cam and including a light control portion, a source of light and photoelectric cell cooperating with said disk, said disk being adapted to alternately cut out or cut in light to said cell with disk movement, a stepping switch controlled by said cell and having a predetermined number of active steps, means for rendering said stepping switch operative at the beginning of a process cycle after said scale has reached equilibrium in response to the base weight of said article prior to processing, and means controlled by said stepping switch after a predetermined number of steps to terminate said process cycle.

9. A system of the character described comprising a scale including a member movable about an axis in generally linear relation to the weight being measured, a cam having a surface of the general shape of a logarithmatic spiral, said cam being movable around an axis, a flexible strap disposed around said cam and coupling said cam and first member together so that said cam movement has a logarithmic relation to said first member movement, a disk movable with said cam, said disk having a light control portion of alternate transparent and opaque elements, a light source and photoelectric cell cooperating with said disk, a stepping switch controlled by said cell and adapted to advance one step for each light interruption incident to disk movement, said switch having a predetermined range of active steps, means for processing an article on said scale and adapted to change the weight of said article during said processing, means for simultaneously rendering said stepping switch and processing means operative after said scale has reached equilibrium in response to said article weight, and means controlled by said stepping switch after it has reached the end of its predetermined range for terminating said processing and for moving said stepping switch into position at the beginning of its starting range in preparation for a succeeding operation.

10. In a system for controlling processing of an article involving a change in weight of said article, said system including a part movable over a range in direct proportion to the weight of an article, a photo-electric cell system means having a logarithmic operating characteristic moved by said part, said means including a member having alternate transparent and opaque portions cooperating with said photo-electric cell system for generating electrical pulses corresponding to movement of said portions, a stepping switch having a predetermined stepping range, means for feeding said pulses to said stepping switch for driving the same, and means controlled by said switch at the end of said range for terminating article processing whereby an article may be processed to a fixed final percentage variation.

11. The system according to claim 10, wherein said stepping switch includes means for returning said switch to a starting position after said switch has reached the end of its predetermined stepping range and means for initiating an operating cycle, said means including delay means for retarding the initiation of processing until after said system has reached equilibrium.

LYMAN L. CAMPBELL.

REFERENCES CITED

The following references are of record in the file of this patent:

UNITED STATES PATENTS

| Number | Name | Date |
|---|---|---|
| 653,256 | Mann | July 10, 1900 |
| 1,994,797 | Thomas | Mar. 19, 1935 |
| 2,016,714 | Gilbert | Oct. 8, 1935 |
| 2,157,705 | Jones | May 9, 1939 |